(12) United States Patent
Niebling et al.

(10) Patent No.: US 7,926,815 B2
(45) Date of Patent: Apr. 19, 2011

(54) SEALING ARRANGEMENT

(75) Inventors: Peter Niebling, Bad Kissingen (DE); Ernst Masur, Untereuerheim (DE); Jens Heim, Bergrheinfeld (DE)

(73) Assignee: Schaeffler KG, Herzogenaurach (DE)

( * ) Notice: Subject to any disclaimer, the term of this patent is extended or adjusted under 35 U.S.C. 154(b) by 490 days.

(21) Appl. No.: 11/577,018

(22) PCT Filed: Oct. 8, 2005

(86) PCT No.: PCT/DE2005/001803
§ 371 (c)(1),
(2), (4) Date: Apr. 11, 2007

(87) PCT Pub. No.: WO2006/039898
PCT Pub. Date: Apr. 20, 2006

(65) Prior Publication Data
US 2008/0036156 A1  Feb. 14, 2008

(30) Foreign Application Priority Data
Oct. 12, 2004 (DE) .......................... 10 2004 049 550

(51) Int. Cl.
*F16J 15/32* (2006.01)
(52) U.S. Cl. ....................... 277/551; 277/571
(58) Field of Classification Search .................. 277/331, 277/551, 571, 572, 576, 577
See application file for complete search history.

(56) References Cited

U.S. PATENT DOCUMENTS

| | | | | |
|---|---|---|---|---|
| 3,356,376 A | * | 12/1967 | Bradfute et al. | 277/574 |
| 3,561,770 A | | 2/1971 | Corsi et al. | |
| 4,172,599 A | * | 10/1979 | Forch | 277/552 |
| 4,208,057 A | * | 6/1980 | Messenger | 277/309 |
| 5,350,181 A | * | 9/1994 | Horve | 277/559 |
| 5,969,518 A | * | 10/1999 | Merklein et al. | 324/173 |
| 6,471,211 B1 | * | 10/2002 | Garnett et al. | 277/351 |
| 6,688,605 B1 | | 2/2004 | Yano et al. | |
| 2002/0074736 A1 | | 6/2002 | Vignotto et al. | |
| 2004/0113366 A1 | | 6/2004 | Mause et al. | |

FOREIGN PATENT DOCUMENTS

DE 101 63 068 A1 10/2002
EP 1505307 PA 2/2005

* cited by examiner

*Primary Examiner* — Shane Bomar
*Assistant Examiner* — Gilbert Y Lee
(74) *Attorney, Agent, or Firm* — Lucas & Mercanti, LLP

(57) ABSTRACT

The invention relates to a sealing arrangement comprising at least one seal and a spinning ring. Said spinning ring is provided with a first hollow cylindrical section, a second hollow cylindrical section in the first section which is disposed concentric to the first section, and a disk-shaped ring section that extends at an angle to the first section. The first section and the second section are embodied monolithically on the spinning ring, at least one elastic sealing lip of the seal resting against the first section.

13 Claims, 4 Drawing Sheets

SEALING ARRANGEMENT

FIELD OF THE INVENTION

The invention relates to a sealing arrangement with at least one seal and with a spinning ring, the spinning ring being provided with a first hollow-cylindrical portion, with a second hollow-cylindrical portion, arranged concentrically to the first portion, in the first portion and with a disk-shaped annular portion angled from the first portion, and the first portion and the second portion being connected in one piece to one another, and in this case at least one elastic sealing lip of the seal bearing against the first portion.

BACKGROUND OF THE INVENTION

A sealing arrangement of this type is described in DE 101 63 068 A1. When the seal is being mounted, that is to say when the sealing lip is being pushed onto the first portion, the sealing lip is often overturned into the opposite direction because of the lack of centering. The sealing function of the seal is consequently partly cancelled or adversely impeded.

SUMMARY OF THE INVENTION

The object of the invention, therefore, is to provide a sealing arrangement by means of which the above-mentioned disadvantage is avoided.

This object is achieved in that an annular gap is formed radially between the first portion and the second portion. The first hollow-cylindrical portion and the second hollow-cylindrical portion thus no longer form a doubling, as in the prior art under consideration, but, instead, are spaced radially apart from one another. The annular gap, which also has essentially a hollow-cylindrical shape, makes it possible that a relatively large connection portion in the form of a hollow cone frustum can be formed between the second hollow-cylindrical portion and the first hollow-cylindrical portion.

The connecting portion serves, in practice, as a centering portion, on which the sealing lip, finally seated with prestress on the first portion, is first centered and is slowly and continuously expanded elastically resiliently up to its definitive seating. The wall of the connecting portion of hollow-conical design is preferably inclined at an angle of $5°>\alpha<30°$. The transition from the connecting portion to the second portion is preferably rounded on the outside, so that the slipping of the sealing lip onto the connecting portion is initially facilitated. The transition is rounded, for example, with a radius which corresponds at least to double the radially smallest wall thickness of the spinning ring.

The second portion is provided for the seating of the spinning ring on a stationary or rotating machine part. A machine part of this type is, for example, a shaft or an inner ring of a rolling bearing, said inner ring being seated on a shaft. The press fit of the second portion on the machine element is protected by means of an overlap of preferably 0.05 to 0.6 mm.

The spinning ring is preferably formed from a metal sheet and, for example, by forming.

According to one embodiment of the invention, the spinning ring is at the same time the carrier of an alternatingly polarized magnetic encoder. The encoder is formed, for example, from an elastomer, into which magnetizable particles are integrated. The annular gap, which is normally an air gap, is delimited axially on one side by the connecting portion and issues axially into the open in the other direction. In the event that an encoder is fastened to the spinning ring, the annular gap may be filled completely or partially with the elastomer.

The seal is preferably reinforced and, as a rule, has two sealing lips. One of the sealing lips bears radially, prestressed, against the first portion. The overlap between the inside diameter of the radial sealing lip and the outside diameter of the first portion is preferably 0.05 to 0.6 mm. The functionally important overlap is advantageously virtually uninfluenced by deformations out of the press fit on account of the radial separation of the second portion from the first portion by the annular gap. The spinning ring, on the sealing surface, has roughness values at the surface of preferably up to $R_a$max of 0.25.

The carrier ring of the seal, preferably an angle ring, may be manufactured selectively from magnetizable, but also from nonmagnetizable sheet metal. Cartridge seals with magnetized encoders on the spinning ring are often delivered, preassembled with the seal and stacked one on the other for mounting in the corresponding rolling bearing. By a carrier ring consisting of nonmagnetizable metal, for example of austenitic steel, being used, the cartridge units can be separated from one another in a simple way during mounting, without adhering to one another and being demounted in an unwanted way on account of the magnetism of the encoder.

BRIEF DESCRIPTION OF THE DRAWINGS

The invention is explained in more detail below with reference to exemplary embodiments.

DETAILED DESCRIPTION OF THE DRAWINGS

Figure 1:
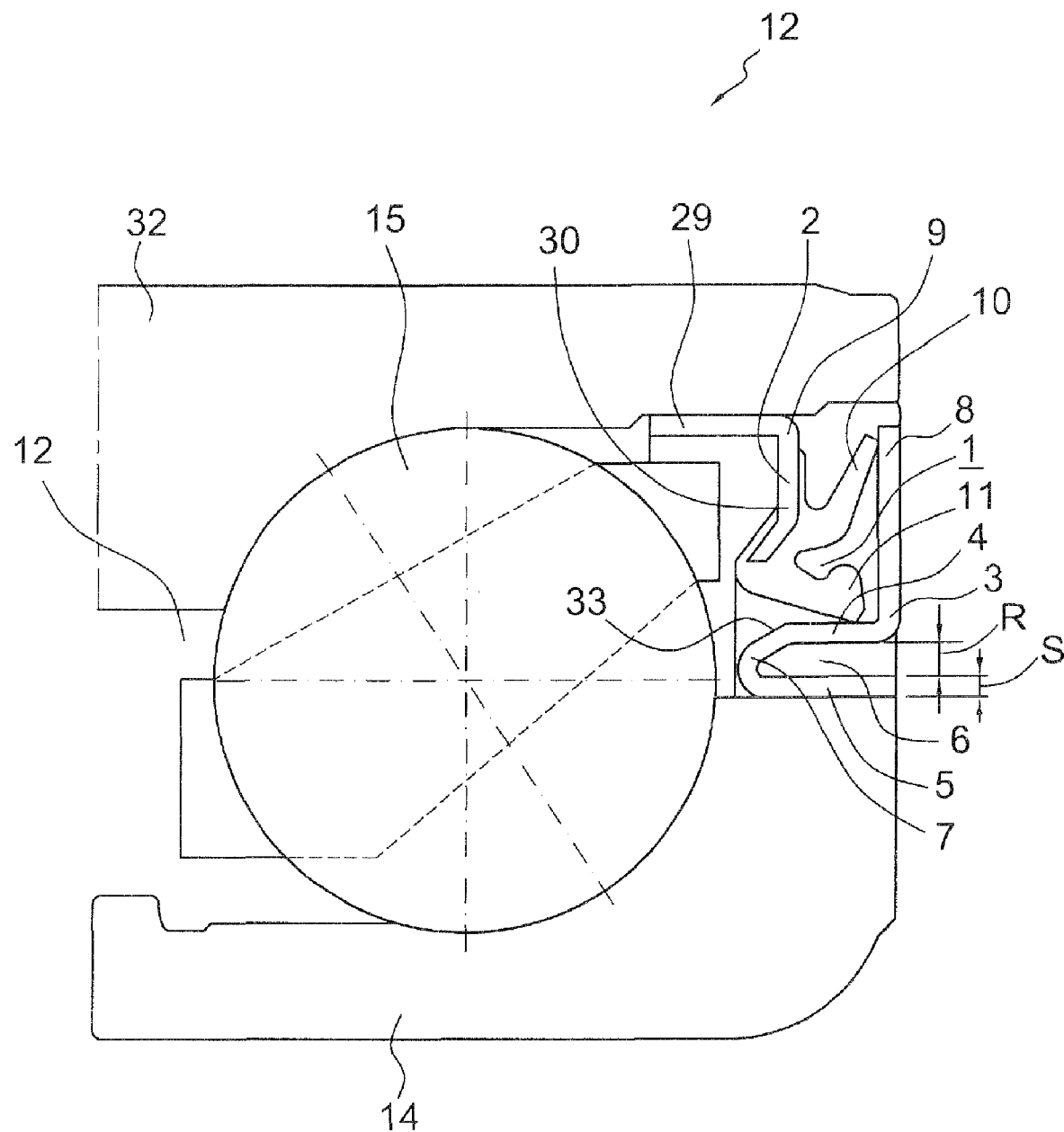
FIG. 1 shows a sealing arrangement preassembled into a unit as a cartridge seal, in a longitudinal section through the longest mid-axis of the sealing arrangement.

FIG. 1 shows a sealing arrangement 1 in the form of a cartridge seal with at least one seal 2 and with a spinning ring 3. The spinning ring 3 is provided with a hollow-cylindrical first portion 4 and circumferentially surrounds a hollow-cylindrical second portion 5 arranged concentrically to the first portion 4. The portions 4, 5 are spaced apart from one another due to an annular gap 6 and are connected to one another in one piece by means of the connecting portion 7. The spinning ring 3 is further provided with a disk-shaped annular portion 8 which emanates at right angles from the first portion 4.

The seal 2 is formed from a carrier ring 9 (sheet metal) with the ring legs 29 and 30 and from elastic material. The ring leg 29 points into the interior of the rolling bearing 12 and the ring leg 30 is slightly bent with its free end toward the rolling bodies 15. The elastic material forms two sealing lips 10 and 11. The first sealing lip 10 is prestressed axially against the annular portion 8. The second sealing lip 11 bears, radially prestressed, against the first portion 4. The second portion 5 is bent over such that it merges into the hollow-frustoconical connecting portion 7 and therefore in one piece into the first portion 4. The smallest radial dimension R of the annular gap 6 having essentially hollow-cylindrical design is at least exactly as large as the largest radial wall thickness S of one of the portions 4 or 5. The connecting portion 7 has a slope 33 which is inclined at an angle of approximately 25° to the second portion 5.

The sealing arrangement 1 is arranged in the rolling bearing 12 between an inner ring 14 and an outer ring 32. The carrier ring 9 of the seal 2 is fixed to the outer ring 32 by means of a press fit of the ring leg 29. The spinning ring 3 is seated on the inner ring 14 by means of a press fit of the second portion 5.

Figure 2:
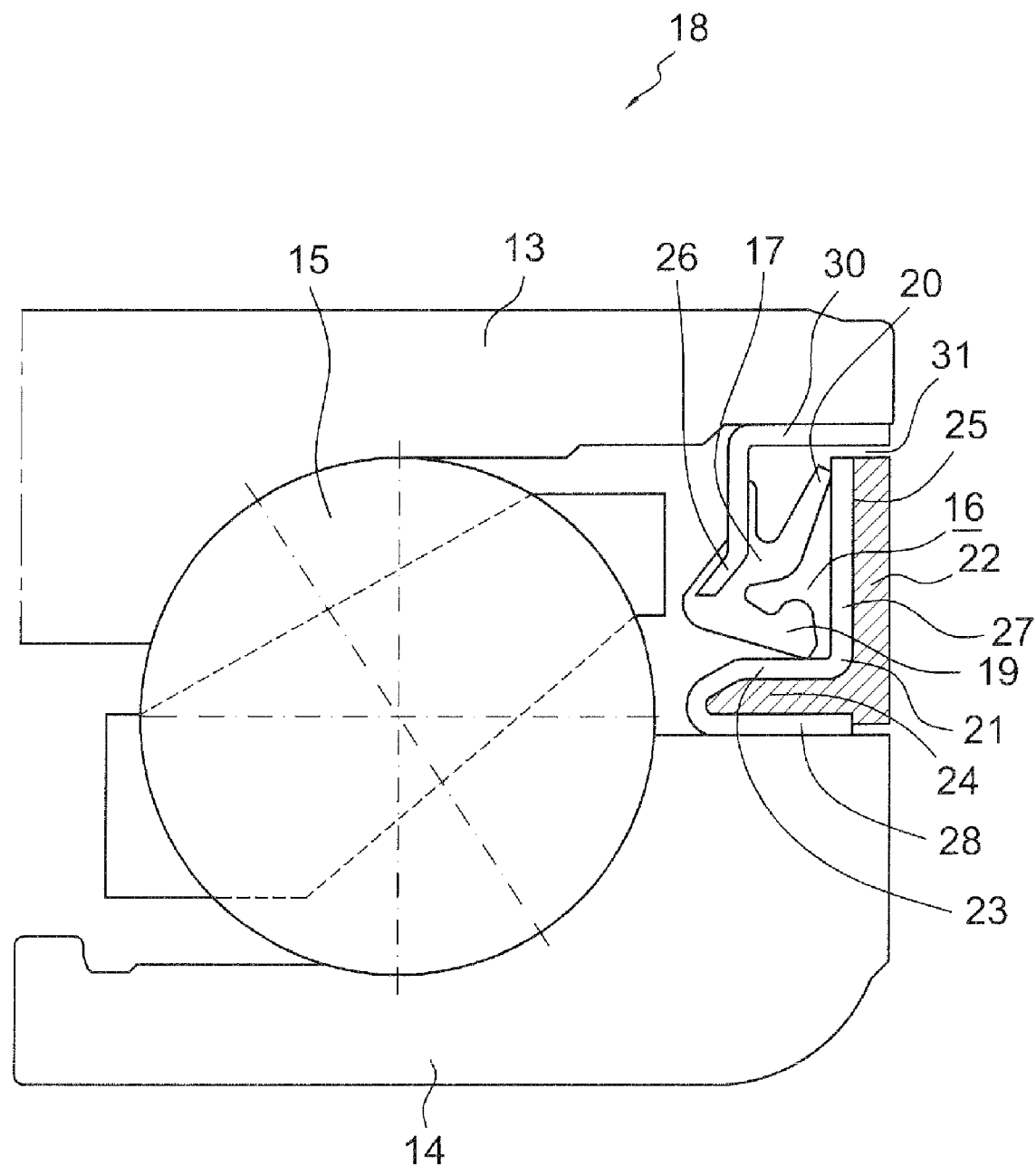
FIG. 2 shows a rolling bearing with a further exemplary embodiment of a sealing arrangement in a sectioned part view along the axis of rotation of the rolling bearing.

FIG. 2 shows a sealing arrangement 16 in the form of a cartridge seal in a rolling bearing 18 (in the form of a wheel bearing) with at least one outer ring 13, with an inner ring 14 and with at least two rows of rolling bodies 15. The sealing arrangement 16 seals off outwardly the interior of the rolling bearing 18, said interior being located radially between the inner ring 14 and outer ring 13. The sealing arrangement 16 has a seal 17 with sealing lips 19, 20, a spinning ring 21 and an encoder 22. The spinning ring 21 is seated with the second portion 28 on the inner ring 14. The encoder 22 is vulcanized onto the spinning ring 21 on a side 25 of the sealing arrangement 16 which faces axially away from the seal 17 and from the rolling bodies 15, filled with magnetizable particles and is alternately polarized magnetically in the circumferential direction of the encoder 22. The annular gap 24 is filled at least partially with the elastic material in the encoder 22.

The seal 17 has a carrier ring 26 consisting of a nonferromagnetic material. The carrier ring 26 surrounds the spinning ring 21 circumferentially by means of the leg 30, a gap 31 being formed radially as a gap seal between the annular portion 27 and the leg 30 of the carrier ring 26. The seal 17 is fixed in the outer ring 13 by means of a press fit of the leg 30. The radial sealing lip 19 seals against the first portion 23. A further sealing lip 20 is prestressed axially against the annular portion 27.

Figure 3:
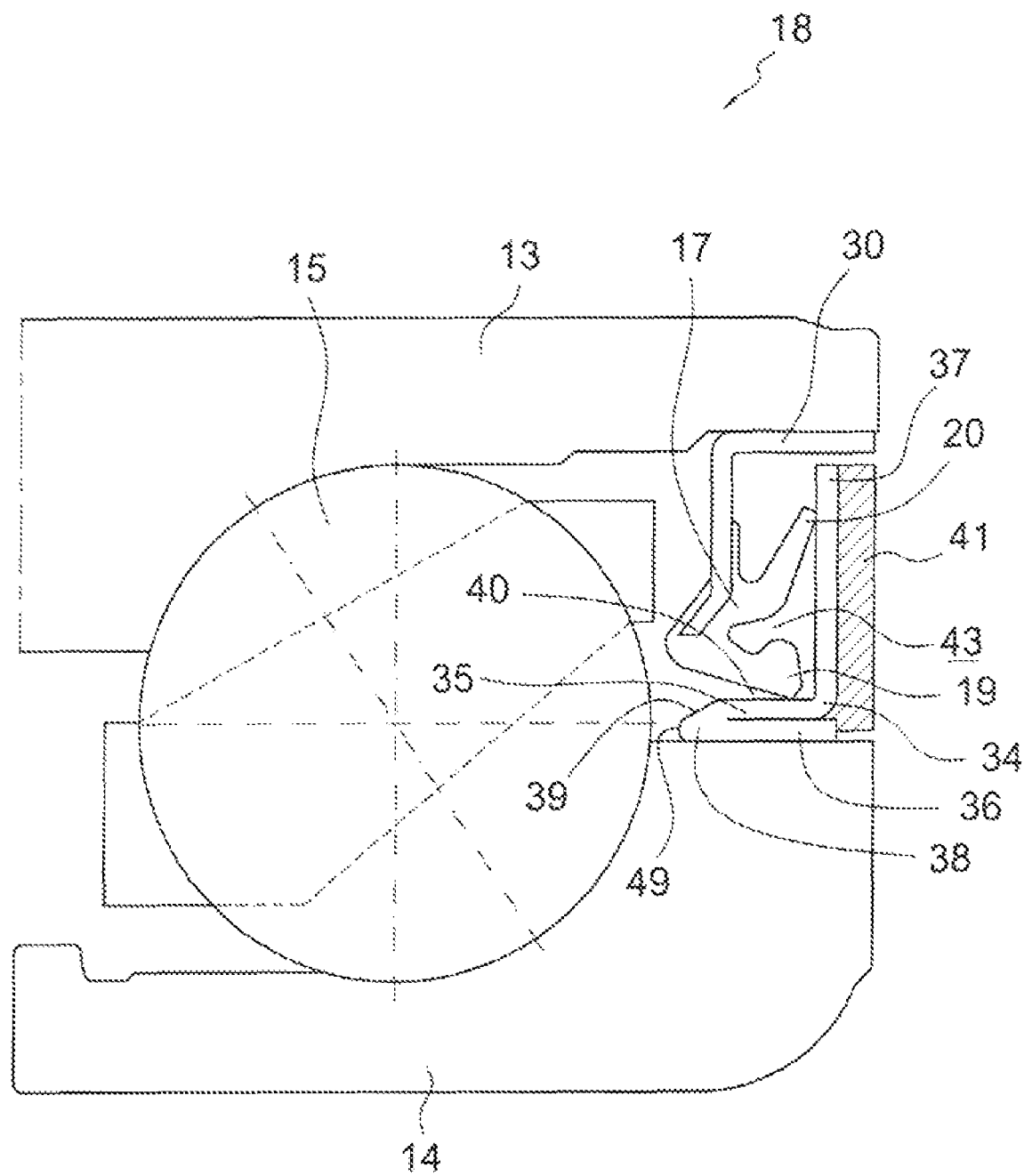
FIG. 3 shows a rolling bearing with a further exemplary embodiment of a sealing arrangement, modified from the sealing arrangement of FIG. 2, in a sectioned part view along the axis of rotation of the rolling bearing.

FIG. 3 shows the rolling bearing 18 with a sealing arrangement 43, modified in comparison with the sealing arrangement 16 according to FIG. 2, in the form of a cartridge seal. In this case, the seal 17 bears with the sealing lips 19 and 20 against a spinning ring 34. An encoder 41 is glued to the spinning ring 34 of the sealing arrangement 43 on a side facing axially away from the rolling bodies 15.

Figure 4:
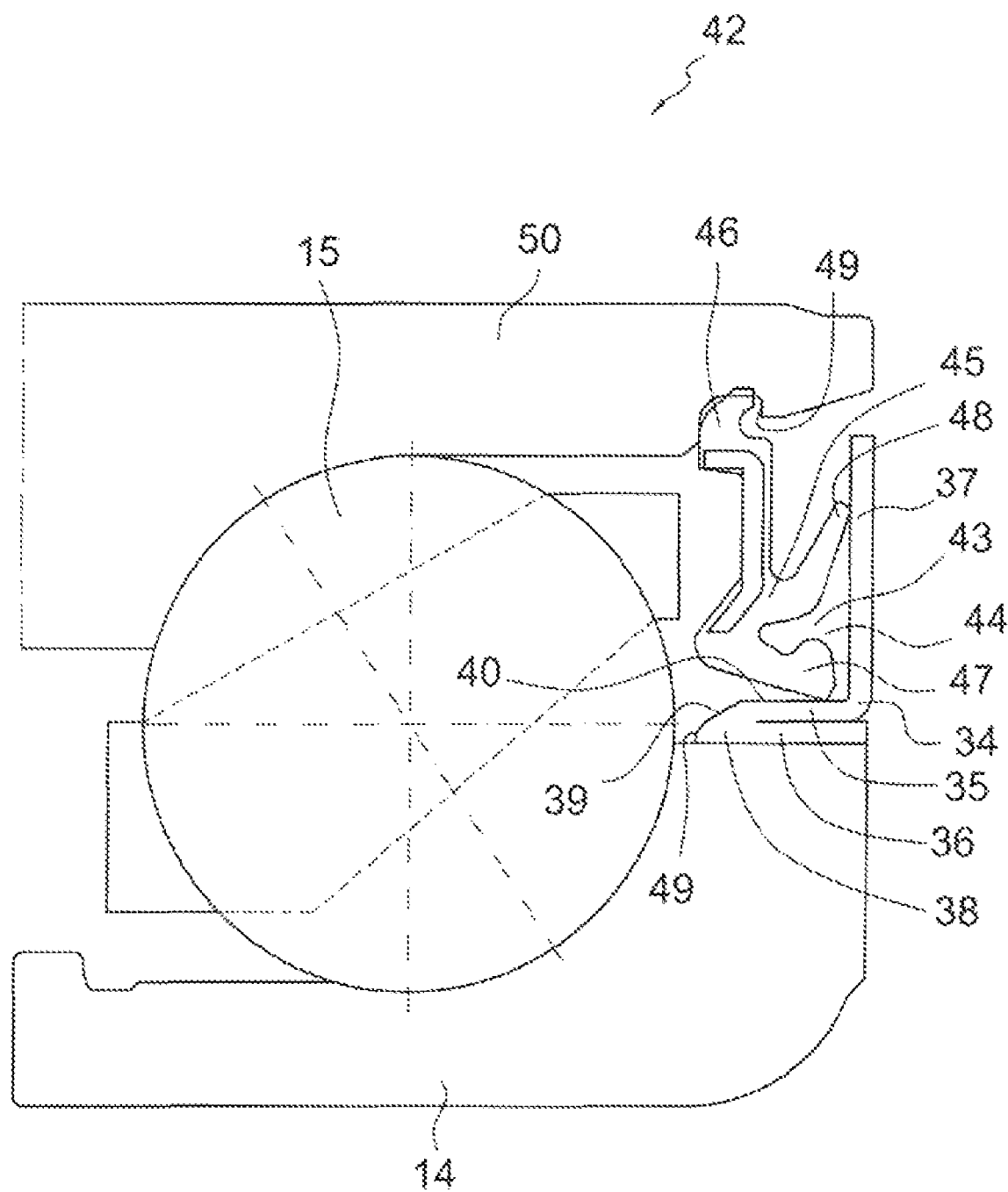
FIG. 4 shows a rolling bearing with a further exemplary embodiment of a sealing arrangement in a sectioned part view along the axis of rotation of the rolling bearing.

The spinning ring 34, which is also a component of the sealing arrangement 44 according to FIG. 4, has a first hollow-cylindrical portion 35, a second hollow-cylindrical portion 36, arranged concentrically to the first portion 35, in the first portion 35, and a disk-shaped annular portion 37 angled from the first portion 35. The first portion 35 and the second portion 36 circumferentially bear radially one against the other, to form a doubling of the metal sheet of the spinning ring 34, and, at an end 38 of the doubling which points axially away from the annular portion 37, merge one into the other in one piece out of the metal sheet.

The spinning ring 34 according to the illustrations of FIGS. 3 and 4 has a cold-formed chamfer 39. The contour of the chamfer 39 emanates from the radially outward-directed cylindrical outer surface area 40 of the first portion 35 and ends at an inclination toward the end 38. The surface area of the chamfer 39 reproduces the outer surface area of a cone frustum. The chamfer 39 merges at the end 38 into a rounded edge 49.

FIG. 4 shows a rolling bearing 42 with a sealing arrangement 44, in which the seal 45 is seated in an annular groove 49' of the outer ring 50 by means of an annular bead 46 consisting of the elastomer of the elastic sealing lips 47 and 48. An arrangement of this type is advantageous, since an annular groove in the form of the annular groove 49' can often be introduced into an outer ring more cost-effective than a press fit for legs of cartridge seals, such as for the legs 29 and 30, can be ground. In contrast to the sealing arrangements 1, 16 and 43, which, preassembled as cartridge seals into structural units, are inserted jointly into the rolling bearings 12 and 18, the seal 45 and the spinning ring 34 are mounted as individual parts. In this case, first, the seal 45 is inserted into the outer ring 50 and then the spinning ring 34 is pressed onto the inner ring 14. The usually difficult centering of the sealing lip on a metal spinning sheet according to the prior art is especially difficult. Therefore, in this case, the chamfer 39 according to the invention is particularly important, since this ensures exact centering without any unwanted overturning of the sealing lip 47.

| Reference symbols | |
|---|---|
| 1 | sealing arrangement |
| 2 | seal |
| 3 | spinning ring |
| 4 | first portion |
| 5 | second portion |
| 6 | annular gap |
| 7 | connecting portion |
| 8 | annular portion |
| 9 | carrier ring |
| 10 | sealing lip |
| 11 | sealing lip |
| 12 | rolling bearing |
| 13 | outer ring |
| 14 | inner ring |
| 15 | rolling body |
| 16 | sealing arrangement |
| 17 | seal |
| 18 | rolling bearing |
| 19 | sealing lip |
| 20 | sealing lip |
| 21 | spinning ring |
| 22 | encoder |
| 23 | first portion |
| 24 | annular gap |
| 25 | side |
| 26 | carrier ring |
| 27 | annular portion |
| 28 | second portion |
| 29 | ring leg |
| 30 | ring leg |
| 31 | gap |
| 32 | outer ring |
| 33 | slope |
| 34 | spinning ring |
| 35 | first portion |
| 36 | second portion |
| 37 | annular portion |
| 38 | end |
| 39 | chamfer |
| 40 | outer surface area |
| 41 | encoder |
| 42 | rolling bearing |
| 43 | sealing arrangement |
| 44 | sealing arrangement |
| 45 | seal |
| 46 | annular bead |
| 47 | sealing lip |
| 48 | sealing lip |
| 49 | edge |
| 50 | outer ring |

The invention claimed is:

1. A sealing arrangement for an annular space, comprising:
   at least one seal affixable to a first surface that delimits the annular space, the seal having at least one elastic sealing lip extending radially into the annular space;

a spinning ring directly affixable to a second surface that delimits the annular space, the spinning ring having a first hollow-cylindrical portion with a first end and a second end, a second hollow-cylindrical portion with a first end and a second end, a disk-shaped annular portion, and a chamfered connecting portion, an annular gap formed radially between the first portion and the second portion, with the second portion being arranged concentrically to the first portion, the first portion and second portion being axially orientable in the annular space, the second portion affixable on the second surface, and the first portion and the second portion being connected to one another directly at the first end of the first portion and the first end of the second portion by means of the chamfered connecting portion having a slope descending at a slanted inclination from the first end of the first portion to the first end of the second portion, the disk-shaped annular portion extending radially from the second end of the first portion into the annular space, and the seal having a first elastic sealing lip bearing against the first portion and a second elastic sealing lip bearing against the annular portion.

2. The sealing arrangement as claimed in claim 1, wherein the radially smallest dimension of the annular gap is at least as large as the largest radial wall thickness of one of the first and second portion.

3. The sealing arrangement as claimed in claim 1, wherein the first portion merges into the second portion at the connecting portion in the form of a hollow cone frustum, the connecting portion adjoining the first portion axially away from the annular portion.

4. The sealing arrangement as claimed in claim 3, wherein one transition from the connecting portion to the second portion is rounded on the outside.

5. The sealing arrangement as claimed in claim 1, wherein the second portion is arranged on a rotating machine part.

6. The sealing arrangement as claimed in claim 1, wherein the second portion is arranged on an inner ring of a rolling bearing.

7. The sealing arrangement as claimed in claim 1, wherein the spinning ring is formed from a metal sheet.

8. The sealing arrangement as claimed in claim 1, wherein an alternatingly polarized magnetic encoder is fixed to the annular portion on a side facing away from the seal.

9. The sealing arrangement as claimed in claim 1, wherein the seal is arranged in an outer ring of a rolling bearing.

10. The sealing arrangement as claimed in claim 1, wherein the seal is fixed to a carrier ring of a rolling bearing.

11. The sealing arrangement as claimed in claim 10, wherein the carrier ring has two ring legs angled with respect to one another.

12. The sealing arrangement as claimed in claim 10, wherein the carrier ring is non-ferromagnetic metal.

13. A spinning ring arrangement for a sealing arrangement of an annular space, comprising:

a spinning ring; and a seal which is affixable to a first surface that delimits the annular space, the spinning ring having a first hollow-cylindrical portion with a first end and a second end, a second hollow-cylindrical portion with a first end and a second end, which is affixable to a second surface that delimits the annular space, arranged concentrically to the first portion and a disk-shaped annular portion angled from the second end of the first portion, and extending radially away from the second portion, the first portion and the second portion, which are each made of sheet metal, radially bearing circumferentially against each other to form a doubling of the sheet metal, and at an end of the doubling which points axially away from the annular portion, the first portion and the second portion merging into one piece, the second end of the second portion extending axially only up to an outer face of the annular portion, and the seal, which is concentric with the first portion, having at least one elastic sealing lip bearing against the first portion and a sealing lip bearing against the annular portion, wherein the spinning ring has a cold-formed chamfer, a contour of the chamfer emanating from a radially outward-directed cylindrical outer surface area of the first end of the first portion and descending at a slanted inclination toward the first end of the second annular portion, where the first portion and the second portion merge, so as to form an outer surface having a shape of a cone frustum.

* * * * *